(12) United States Patent
Liao et al.

(10) Patent No.: US 7,283,520 B1
(45) Date of Patent: Oct. 16, 2007

(54) DATA STREAM PERMUTATION APPLICABLE TO LARGE DIMENSIONS

(75) Inventors: Heng Liao, Belcarra (CA); Xiaofeng Wang, British Columbia (CA); Zhao Wu, San Jose, CA (US)

(73) Assignee: PMC-Sierra, Inc., Burnaby (CA)

( * ) Notice: Subject to any disclaimer, the term of this patent is extended or adjusted under 35 U.S.C. 154(b) by 987 days.

(21) Appl. No.: 10/126,466

(22) Filed: Apr. 19, 2002

Related U.S. Application Data

(63) Continuation-in-part of application No. 09/943,886, filed on Aug. 30, 2001, now Pat. No. 7,177,314.

(51) Int. Cl.
*H04Q 11/00* (2006.01)
*H04L 12/28* (2006.01)

(52) U.S. Cl. .................. 370/357; 370/386; 370/413
(58) Field of Classification Search .................. None
See application file for complete search history.

(56) References Cited

U.S. PATENT DOCUMENTS

| | | | |
|---|---|---|---|
| 3,800,289 A | 3/1974 | Batcher | |
| 3,812,467 A | 5/1974 | Batcher | |
| 6,351,466 B1* | 2/2002 | Prabhakar et al. | 370/413 |
| 6,778,536 B1* | 8/2004 | Ofek et al. | 370/395.4 |
| 6,920,135 B1* | 7/2005 | Lea | 370/389 |
| 6,934,471 B1* | 8/2005 | Carvey et al. | 398/45 |
| 7,042,883 B2* | 5/2006 | Fan et al. | 370/395.4 |
| 2001/0026558 A1* | 10/2001 | Kamiya | 370/443 |
| 2001/0050916 A1* | 12/2001 | Krishna et al. | 370/419 |
| 2002/0021667 A1* | 2/2002 | Davis et al. | 370/230 |
| 2002/0024949 A1* | 2/2002 | Tomonaga et al. | 370/389 |
| 2002/0057712 A1* | 5/2002 | Moriwaki et al. | 370/463 |
| 2002/0064154 A1* | 5/2002 | Sharma et al. | 370/357 |
| 2003/0026287 A1* | 2/2003 | Mullendore et al. | 370/442 |
| 2005/0078673 A1* | 4/2005 | Sakamoto et al. | 370/389 |

OTHER PUBLICATIONS

Alan Tucker (1995) Applied Combinatorics. Third Edition, John Wiley & Sons pp. 159-161, theorem 2.

* cited by examiner

*Primary Examiner*—Andrew C. Lee
*Assistant Examiner*—Clemence Han
(74) *Attorney, Agent, or Firm*—Quine Intellectual Property Law Group, P.C.; Stephen J. LeBlanc

(57) ABSTRACT

Multi-stage networks are used for data stream permutations involving merging and demultiplexing—providing arbitrary data unit time-space interchange that can be used to solve a range of problems particularly in the field of digital data communications, particularly in digital data communication involving advanced networks for exchanging data in packets, cells, or other data units.

53 Claims, 11 Drawing Sheets

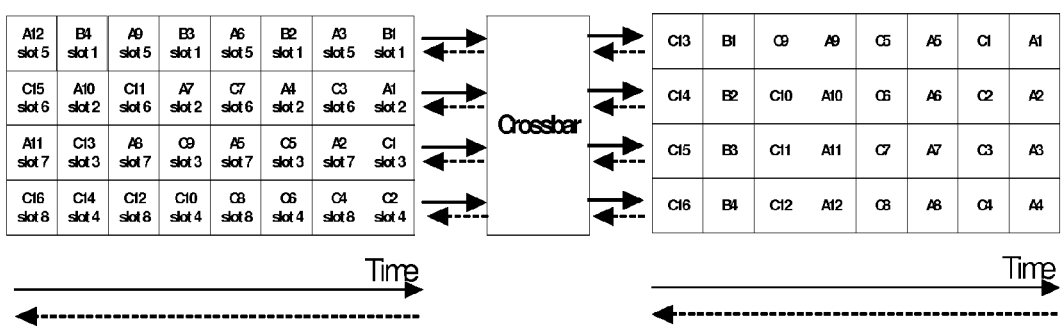
FIG. 6: A PERMUTATION EXAMPLE

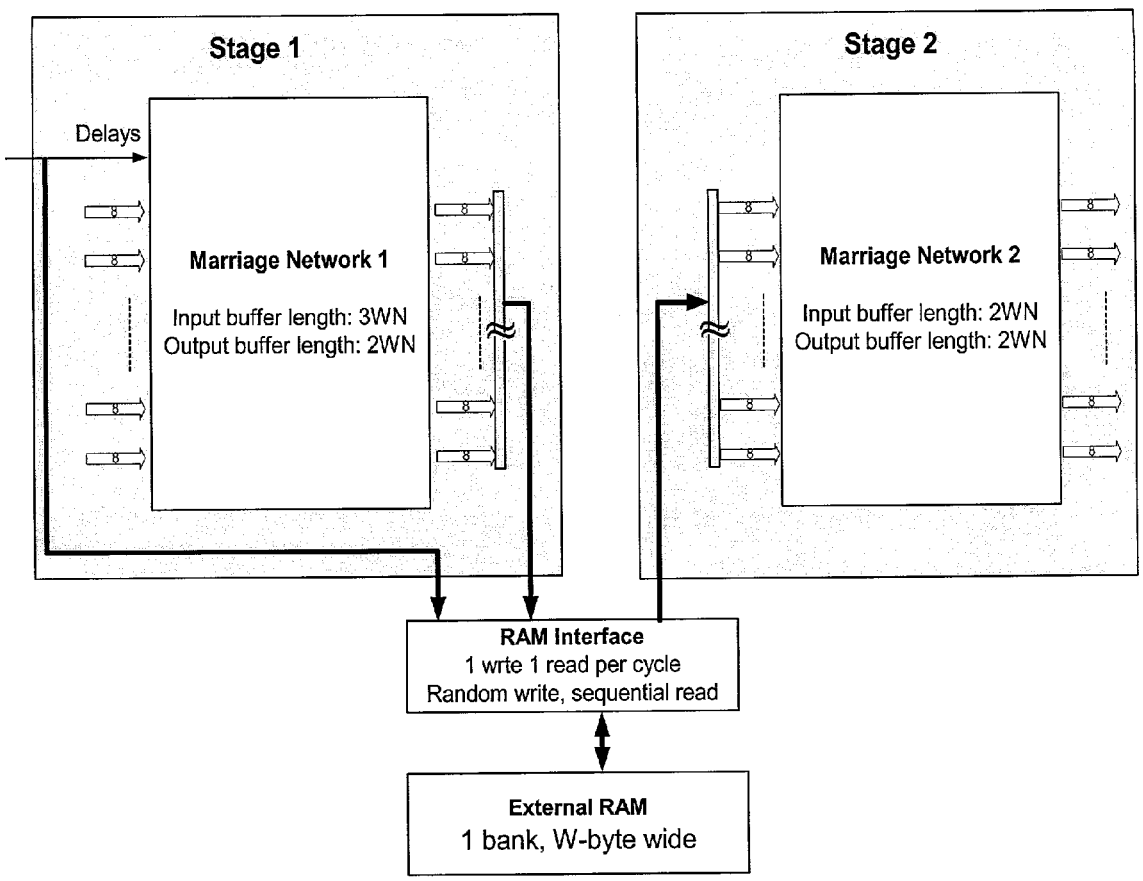
FIG. 7A: EXTENDED PERMUTATION NETWORK FOR PERMUTATION WITH LARGE MAXIMUM DELAY.

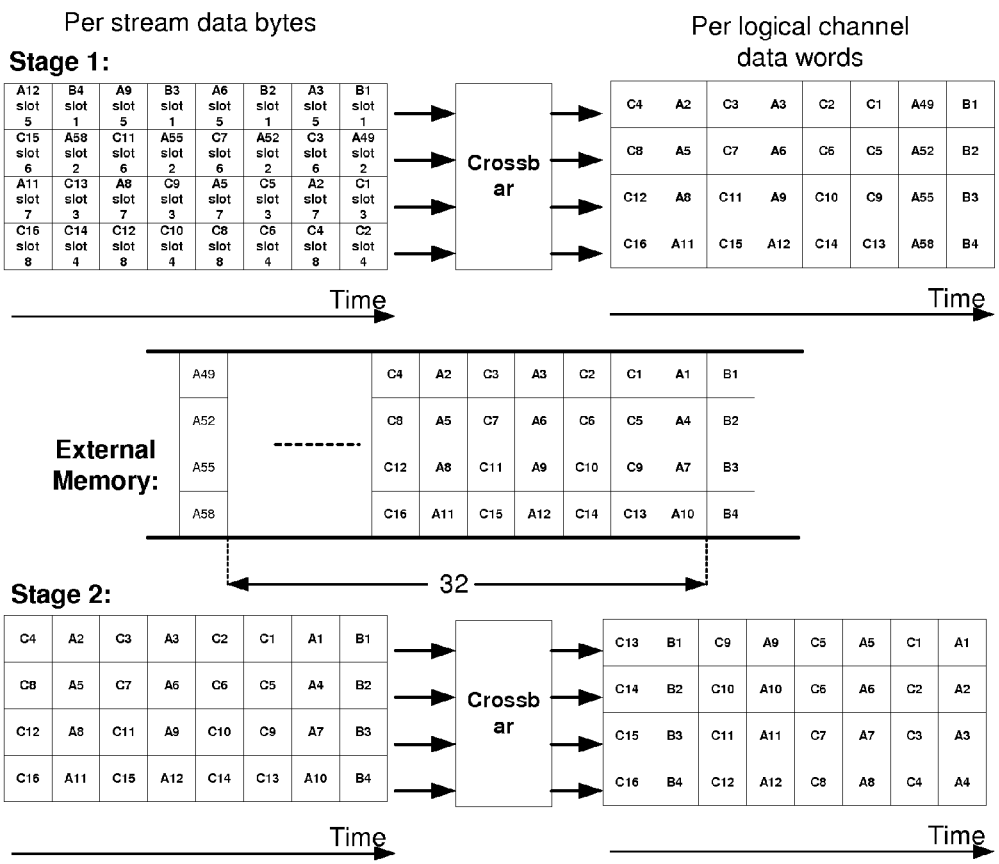
FIG. 7B: AN EXAMPLE PERMUTATION BASED ON EXTENDED NETWORK.

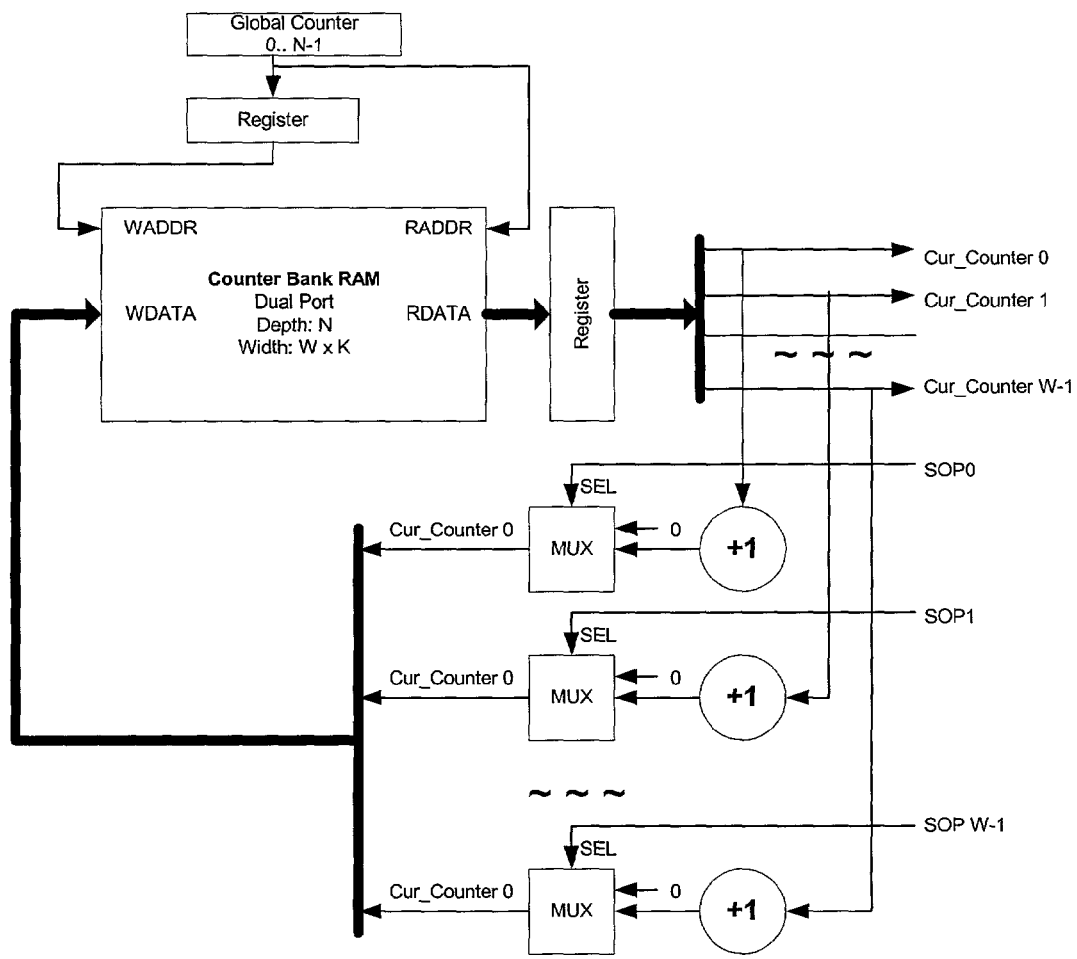
FIG. 8: INPUT ADDRESS COUNTER BANK LOGIC BASED ON DUAL-PORT RAM

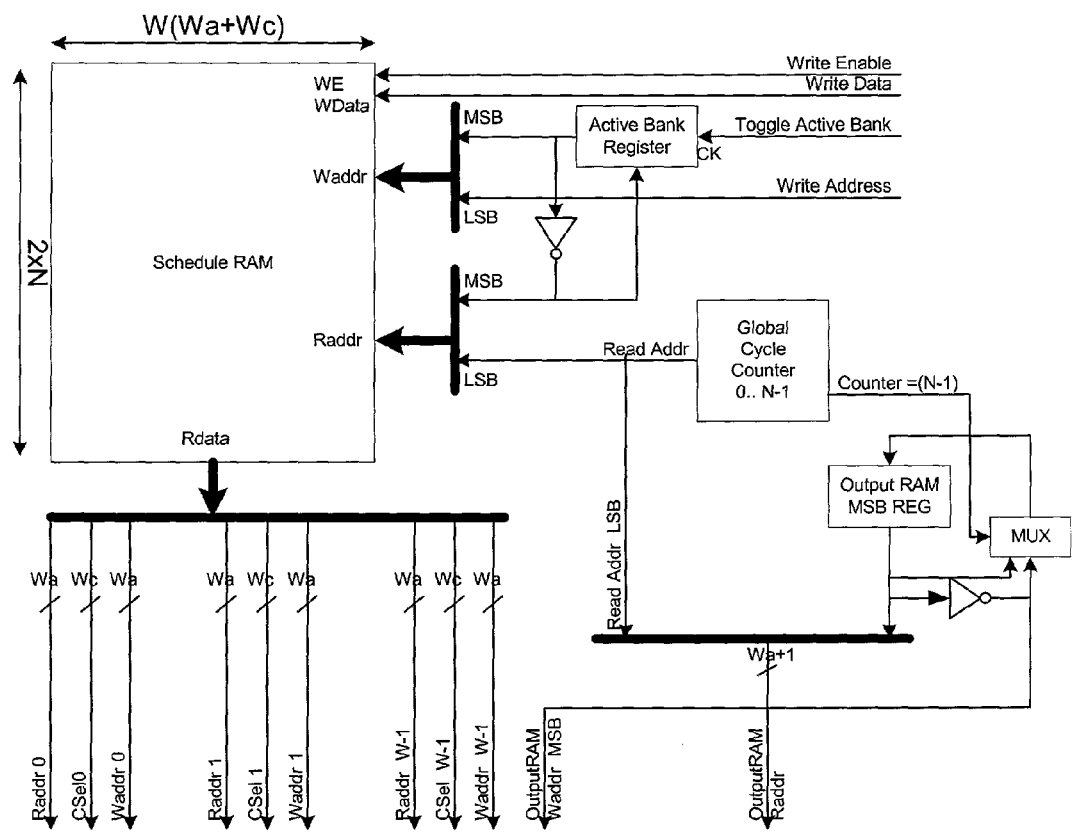
*FIG. 9: SCHEDULE RAM AND SURROUNDING LOGIC*

DATA STREAM PERMUTATION APPLICABLE TO LARGE DIMENSIONS

CROSS REFERENCE TO RELATED APPLICATIONS

This application is a continuation in part of co-assigned patent application Ser. No. 09/943,886 filed 30 Aug. 2001, entitled TRANSMIT VIRTUAL CONCATENATION PROCESSOR.

The above referenced documents and application and all documents referenced therein are incorporated in by reference for all purposes.

This application may be related to other patent applications and issued patents assigned to the assignee indicated above. These applications and issued patents are incorporated herein by reference to the extent allowed by patent office practice and/or under applicable laws.

COPYRIGHT NOTICE

Pursuant to 37 C.F.R. 1.71(e), Applicants note that a portion of this disclosure contains material that is subject to and for which is claimed copyright protection (such as, but not limited to, source code listings, screen shots, user interfaces, or user instructions, or any other aspects of this submission for which copyright protection is or may be available in any jurisdiction.) The copyright owner has no objection to the facsimile reproduction by anyone of the patent document or patent disclosure, as it appears in the Patent and Trademark Office patent file or records. All other rights are reserved, and all other reproduction, distribution, creation of derivative works based on the contents, public display, and public performance of the application or any part thereof are prohibited by applicable copyright law.

FIELD OF THE INVENTION

The present invention relates to a method and/or system and/or apparatus for effectively performing data permutations. Specific embodiments involve pipelined and/or scalable system and/or method that can be used to perform multi-dimensional permutation (e.g., position-rearrangement) or mapping of data units in time and space. According to specific embodiments, one of the dimensions involved can be arbitrarily large as long as the permutation is entry-wise periodic at that dimension.

In further embodiments, the invention provides a generalized approach for doing arbitrary mapping/interchange/switching function between two wide datapath interfaces requiring zero overspeed. In specific embodiments, the invention can provide a structure and/or method for a hardware implementation of a SONET Virtual Concatenation Receive/Transmit processor.

BACKGROUND

The discussion of any work, publications, sales, or activity anywhere in this submission, including in any documents submitted with this application, shall not be taken as an admission that any such work constitutes prior art. The discussion of any activity, work, or publication herein is not an admission that such activity, work, or publication existed or was known in any particular jurisdiction.

Aspects of the discussion and documents found in U.S. Pat. Nos. 3,812,467, "Permutation Network", and 3,800,289, "Multi-Dimensional Access Solid State Memory" have been found to be of interest. These patents are not concerned with stream merging or with multiple streams of data (they instead deal with the problem of allowing a single processor to access a single memory in either a bit-wise or a word-wise manner). However, they do present some data handling techniques that are of interest in understanding the present invention. Among other issues, the patents discuss a multi-stage network (used in conjunction with a memory and addressing scheme that is not further discussed herein) that is used to transform the processor's view of the memory from a bit-wise organization to a word-wise organization, or vice versa.

SUMMARY

According to specific embodiments of the present invention, a data stream merging problem is handled in a way that can be understood as algebraically similar to a multidimensional memory problem. According to specific embodiments, the present invention applies multi-stage networks to stream merging and demultiplexing. Such networks are understood to have desirable properties from a space and speed standpoint, especially when scaled up to large dimensions. According to specific embodiments of the present invention, the generalization of data stream permutation allows arbitrary data unit time-space interchange and can be used to solve a broader range of problems.

According to specific embodiments of the invention, time-space permutation provides one or more of the following:

1. It is scalable and able to trade off complexity with on-chip memory size or vice versa.

2. The complexity of the logic required to implement, together with the complexity of the layout and the routing of the interconnections, can be optimized. In particular the routing complexity can be minimized (i.e., the number of wide buses can be kept small, and the layout made regular).

3. It can be simple, regular, and require only simple control means.

4. It can be made general enough to accommodate all possible cases that would be expected to arise. It supports some number of streams each carrying several channels or portions of channels and supports possible large differential delays among data flows of a channel carried over multiple streams.

5. It is flexible enough to support various possible permutations for a given input format with minimum change in the circuitry. For example, it allows the merged words of a channel in one permutation period be either contiguous or separate in time. For instance, with minimum change in circuitry, the output stream can be reconfigured to have the two merged words of channel A being contiguous instead of separate.

6. It minimizes the impact of changes in input format (or provisioning of input streams among channels) on the operation.

7. It is hitless, i.e., if configuration changes the system operation continues smoothly for the unaffected channels.

8. It supports failure localization, e.g., whenever there are abnormalities in a subset of channels, the permutation of other channels is not be affected.

9. It is able to accommodate small dynamic changes in differential delays if a channel is carried over multiple streams.

10. It is capable of being applied to either direction of stream merging/demultiplexing (e.g., to the merging of narrow streams into a wide stream, and to the splitting of wide streams into several narrow streams).

Various embodiments of the present invention provide methods and/or systems and/or devices that can be incorporated into data communications systems or networks. In specific embodiments, the invention provides for a communication network and/or substantial components thereof, that utilize one or more of the teachings provided herein.

Thus, in further embodiments, the present invention may be understood in the context of logic methods and/or devices operating to effect a data communication system or network. In particular, embodiments of the present invention include modified SONET, ATM, IP, etc. networks and/or devices.

Software/Logic Implementations

Various embodiments of the present invention provide methods and/or systems of data stream handling that can be implemented on a general purpose or special purpose information handling devices using a suitable programming language such as Java, C++, Cobol, C, Pascal, Fortran, PL1, LISP, RTL, assembly, etc., and any suitable data or formatting specifications, such as various versions of data format specifications used with SONET, ATM, IP, etc.

In the interest of clarity, not all features of an actual implementation are described in this specification. It will be understood that in the development of any such actual implementation (as in any software and/or logic development project), numerous implementation-specific decisions must be made to achieve the developers' specific goals and subgoals, such as compliance with system-related and/or business-related constraints, which will vary from one implementation to another. Moreover, it will be appreciated that such a development effort might be complex and time-consuming, but would nevertheless be a routine undertaking of software engineering for those of ordinary skill having the benefit of this disclosure.

Other Features & Benefits

The invention and various specific aspects and embodiments will be better understood with reference to the following drawings and detailed descriptions. For purposes of clarity, this discussion refers to devices, methods, and concepts in terms of specific examples. However, the invention and aspects thereof may have applications to a variety of types of devices and systems. It is therefore intended that the invention not be limited except as provided in the attached claims and equivalents.

Furthermore, it is well known in the art that logic systems and methods such as described herein can include a variety of different components and different functions in a modular fashion. Different embodiments of the invention can include different mixtures of elements and functions and may group various functions as parts of various elements. For purposes of clarity, the invention is described in terms of systems that include many different innovative components and innovative combinations of innovative components and known components. No inference should be taken to limit the invention to combinations containing all of the innovative components listed in any illustrative embodiment in this specification.

In some of the drawings and detailed descriptions below, the present invention is described in terms of the important independent embodiment of a system operating on a digital data network. This should not be taken to limit the invention, which, using the teachings provided herein, can be applied to other situations, such as cable television networks, wireless networks, etc.

All references, publications, patents, and patent applications cited herein are hereby incorporated by reference in their entirety for all purposes.

BRIEF DESCRIPTION OF THE DRAWINGS

FIG. 6: A Permutation Example

FIG. 7A: Extended permutation network for permutation with large maximum delay.

FIG. 7B: An Example Permutation Based On Extended Network.

FIG. 8: Input Address Counter Bank logic based on dual-port RAM

FIG. 9: Schedule RAM and surrounding Logic

DESCRIPTION OF SPECIFIC EMBODIMENTS

1. General Discussion

Figure 1:
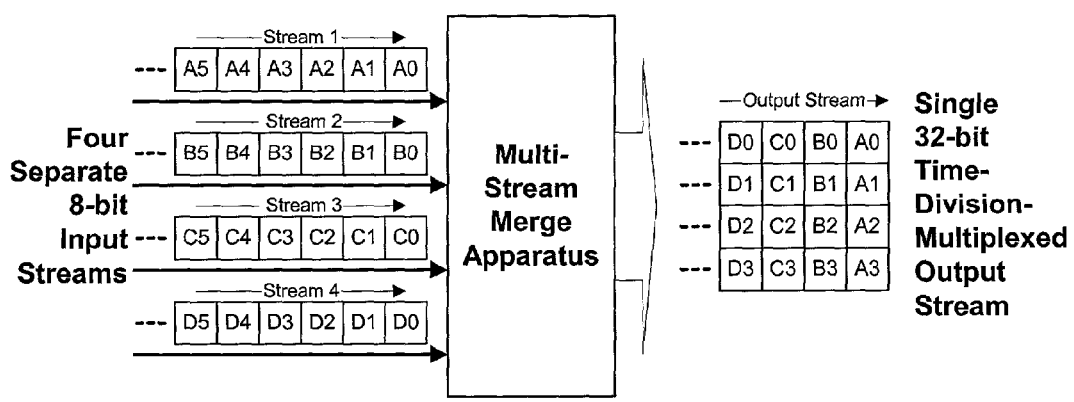
FIG. 1: An example of merging 4 spatially separate streams into a single stream.

Time-space permutation (or mapping) finds many applications in practice. For instance, it is often required to merge different data streams received from separate physical entities into a single stream, or to split one stream among multiple receivers. In this case, the single stream may be of larger width and could normally be time-division-multiplexed (TDM) among the several narrower streams. As a particular example, 32-bit words placed on a 32-bit bus may have to be split into four streams, with successive 32-bit words being sent to 4 different destinations of width 8 bits each. The reverse is also true, wherein data arriving on 4 separate channels is accumulated and time-multiplexed onto a single 32-bit channel. This type of processing is often found where a single wide data bus is interfaced to several narrow data buses, or where several physical layer interface devices are interfaced to a single wide high-speed local system bus. FIG. 1 illustrates how four independent data streams A, B, C and D, possibly of different widths may be input to a merge apparatus that accumulates four bytes at a time from each stream and then outputs parallel 32-bit words on to a 32-bit bus, with consecutive words on the 32-bit bus consisting of four bytes from successive input streams. The reverse is also true, wherein a single 32-bit data stream carrying 32-bit words belonging to logically separate channels may be de-multiplexed into four physically separate 8-bit streams.

Figure 2:
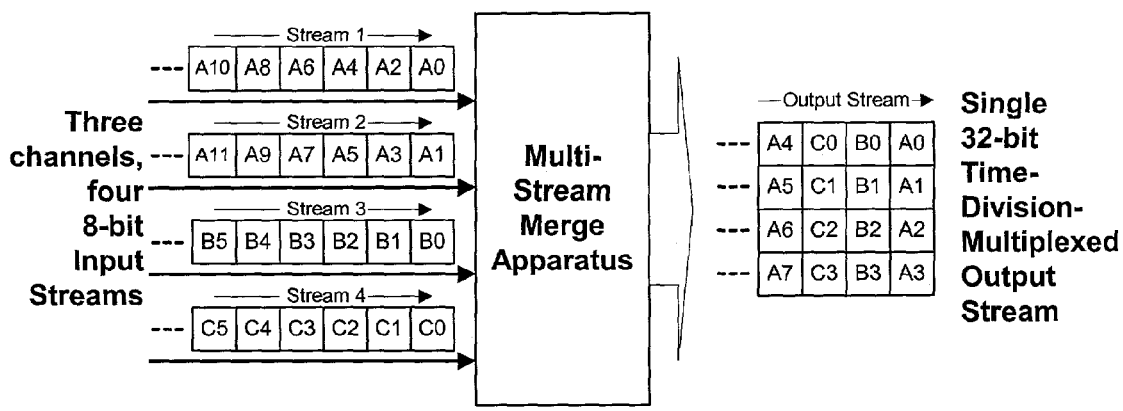
FIG. 2: An example of merging three channels of different widths into a single stream.

Note, however, the widths of data streams received from separate physical entities may be different. For presentation of such complicated cases, it is convenient to formally define terms: stream and channel. At the input of a merge apparatus, a stream is a contiguous data flow whose width is the minimum size of a data unit of all data of concern. A channel is a data flow that is logically separate from others due to its distinct origination or destination. For practical applications, it is often required that a merged word consists of successive data units belonging to only one channel. For example, three physical layer devices, A, B, and C, that produce data of widths 16 bits, 8 bits, and 8 bits, respectively, are to be connected to a system bus of width 32 bits. Channel A is carried over streams 1 and 2, channel B stream 3, and channel C stream 4. If successive data units of channel A are called A0, A1, and so on, then the example can be illustrated by FIG. 2.

Figure 3:
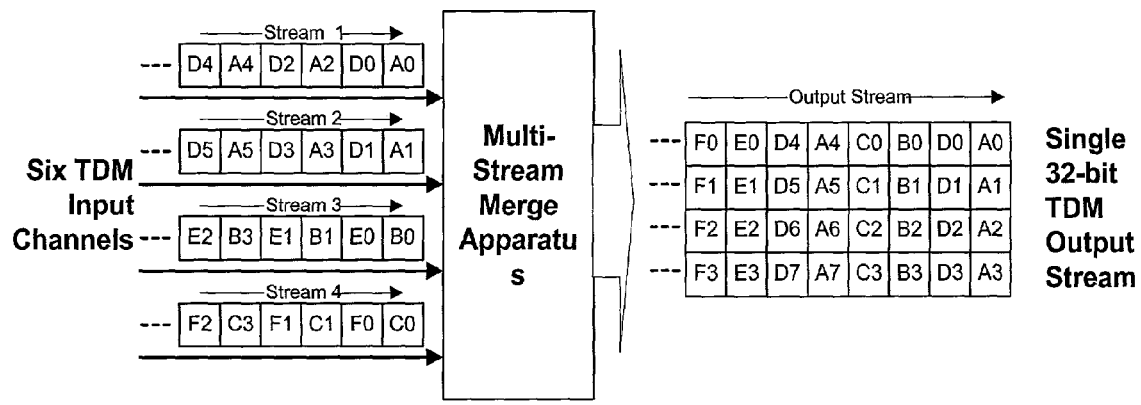
FIG. 3: An example of merging time and space separated channels into a single stream.

In the above two examples, the permutation patterns repeat themselves after each 4 cycles (in other words, the permutation has a period N=4) and there are 4 possible byte locations (in other words, the permutation has a width W=4) at each cycle, the examples, in a more general sense, are time-space permutation problems of dimension 4-by-4. There are also cases in practice where an input stream is shared by multiple channels. That is, the input channels can be TDM onto a single input stream, allowing their aggregated width being a multiple of the width of the wider stream. This is often necessary when the aggregated width of channels is too large to put on a single bus. For example, six TDM channels, two of width 16 bits and four of width 8 bits, are to be merged into a single stream of width 32 bits, as illustrated in FIG. 3.

As shown in the figure, each channel appears in the input streams every other time instants; channels A and D share streams 1 and 2, channels B and E share stream 3, and channels C and F share stream 4. Since it takes 2 time instants or clock cycles to present at least one byte from each input stream and the output stream is of width 4 bytes, it takes 8 time instants to form at least one output word. Consequently, this is a time-space permutation problem of dimension 4-by-8. In other words, before the arrival of 8 input parallel words, a complete permutation can not be accomplished.

Still, more complicated cases may arise in practice. Unlike the example shown in the figure, the multiple input streams that carry one channel do not have to be contiguous in space. Furthermore, the data flows of one channel over different streams may not be time aligned. For instance, channel A and D may share streams 1 and 4 instead of streams 1 and 2, and A1, A3, etc. may be delayed by x time instants or clocks relative to A0, A2, etc. This happens in optical communications when multiple physical streams associated with a channel are transmitted through different paths thereby resulting in differential delays. In this case, the dimension of the problem can be extremely large depending on the differential delays among physical streams.

Figure 4:
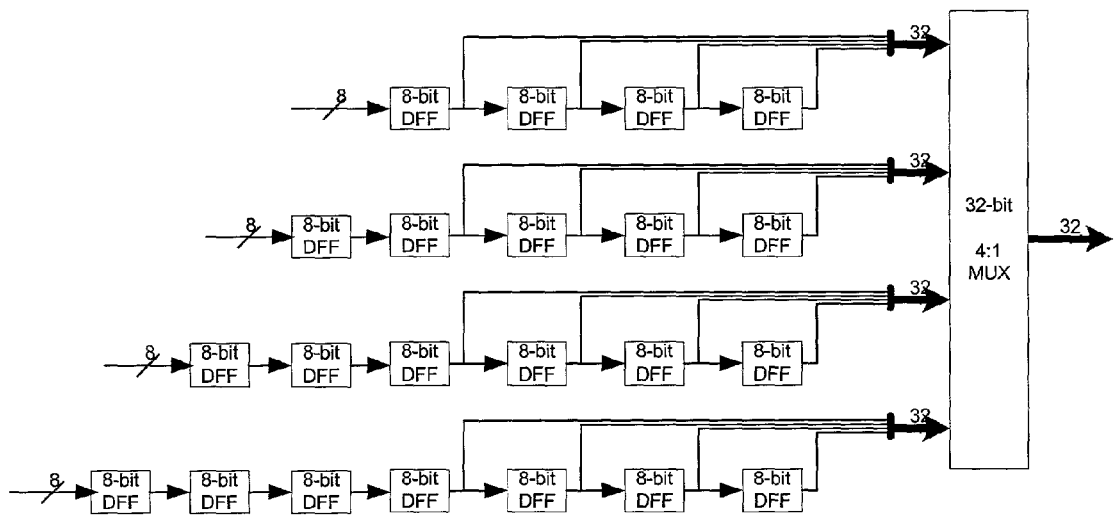
FIG. 4: An Example of Register based designs (4 channels, 32-bit datapath)

One way of solving the above merge problem is to use an arrangement of shift registers and multiplexers such that the narrower-width data are shifted into independent shift registers, one per input data stream, and then the contents of the shift registers are successively multiplexed on to a single wide output bus. The 8-bit to 32-bit conversion example shown in FIG. 1 requires four shift registers into which channels A, B, C, D are shifted, 8-bits at a time. The lengths of the four shift registers are 32 bits, 40 bits, 48 bits, and 56 bits for channels A, B, C, and D, respectively. When a complete 32-bit word is available from a particular stream, it is output as a unit on the 32-bit output bus. While this solution is simple, it suffers from the defect that the complexity of the logic and routing grows as the square of the size of the output bus; an output bus of 256 bits coupled to 32 8-bit input buses requires 32 shift registers of length 256 bits to 504 bits and a 32:1 multiplexer that is also 256 bits wide, pulsing the connection routing area occupied by 32 256-bit data buses. The result is a very large and expensive circuit that is not capable of running at high speeds. In addition, the control complexity becomes substantial when data of different widths is combined on to the output bus and it is questionable if more complicated cases such as that shown in FIG. 3 can be handled. An example of the shift-register-based design is shown in FIG. 4.

It is possible to solve some of the difficulties encountered with the above approach by utilizing a data RAM to buffer the data. Some degree of reduction may be obtained in the routing and logic impact in this manner. The RAM would need to run at a high enough data rate to permit data to be written to it from each narrow stream in succession. When sufficient data are available within the RAM buffer for any one channel to form a complete word on the wider data bus, the data are read out on to the output bus. This solution, however, necessitates a RAM and surrounding logic of extremely high speed (operating at N times the data rate of any one input stream, where N is the number of separate streams). This is not feasible or inexpensive when high data rates is encountered. Similar structures using individual registers in place of the RAM have also been proposed, and also possess the same defects.

Other approaches using shifting networks have also been proposed and implemented. These are relatively more flexible than the simple shift register mechanism described above, and involve the use of multi-stage shifting networks to shift and align incoming data from narrower streams to various positions on a wider stream, followed by register and buffer logic to merge the various narrow data words together into the desired time-multiplexed output. However, they suffer from the same $N^2$ complexity issues as the shift register approach, and are infeasible at high speeds and/or large data widths.

Example Solutions According to Specific Embodiments

Definition

Denote the location of an entry by a tuple (s, t), where s stands for the space location and t stands for the time location. The mapping of an entry from (s, t) to (s', t') can then be represented as (s, t)→(s', t'). A time-space permutation is said to be entry-wise periodic with period N, if for any mapping (s, t)→(s', t'), there is an (s, t+pN)→(s', t'+pN) for any integer p.

By the above definition, an entry-wise periodic time-space permutation with period N and space dimension W is completely defined by a set of NW distinct mappings (s, t)→(s', t'), $1 \leq s \leq W$, $1 \leq t \leq N$. In addition, there exist a set of positive integers (k(s, t)), $1 \leq s \leq W$, $1 \leq t \leq N$ such that the permutation defined by the set of mappings (s, t)+k(s, t))→(s', t') is a permutation problem of dimension W-by-N. Further, it can be shown that there exists one such set of {k(s,t)} that contains at least one zero element.

The maximum differential delay (or the maximum delay) of an entry-wise periodic time-space permutation as defined above is:

D=max{k(s,t), $1 \leq s \leq W$, $1 \leq t \leq N$}, where {k(s,t)} is the set containing at least one zero element and such that (s, t+k(s,t))→(s', t') defines a permutation problem of dimension W-by-N. Furthermore, k(s,t) and D-k(s,t) are the lead time and delay of entry (s,t), respectively. The above definition used the fact that the maximum delay of a permutation is equal to the maximum lead time among all entries.

A time-space permutation problem is a special case of entry-wise periodic permutation problems, i.e., it is an entry-wise permutation problem with maximum delay D=0. In this sense, permutations considered according to specific embodiments of the invention are entry-wise periodic. Permutation hereafter can be understood to indicate entry-wise periodic permutation including its special case.

Basic Permutation Network

According to specific embodiments, the invention provides a scalable solution that is cost-effective regardless of the dimension of the problem. This is achieved by using a generic, scalable, and yet simple basic permutation network that is suitable for permutations of relatively small dimensions as well as entry-wise periodic permutations of small maximum delays. This simple permutation network is then extended according to specific embodiments of the invention to support practical permutation problems with large maximum delays. The structure of an example basic permutation network according to specific embodiments of the present invention is illustrated in FIG. 5.

Figure 5:
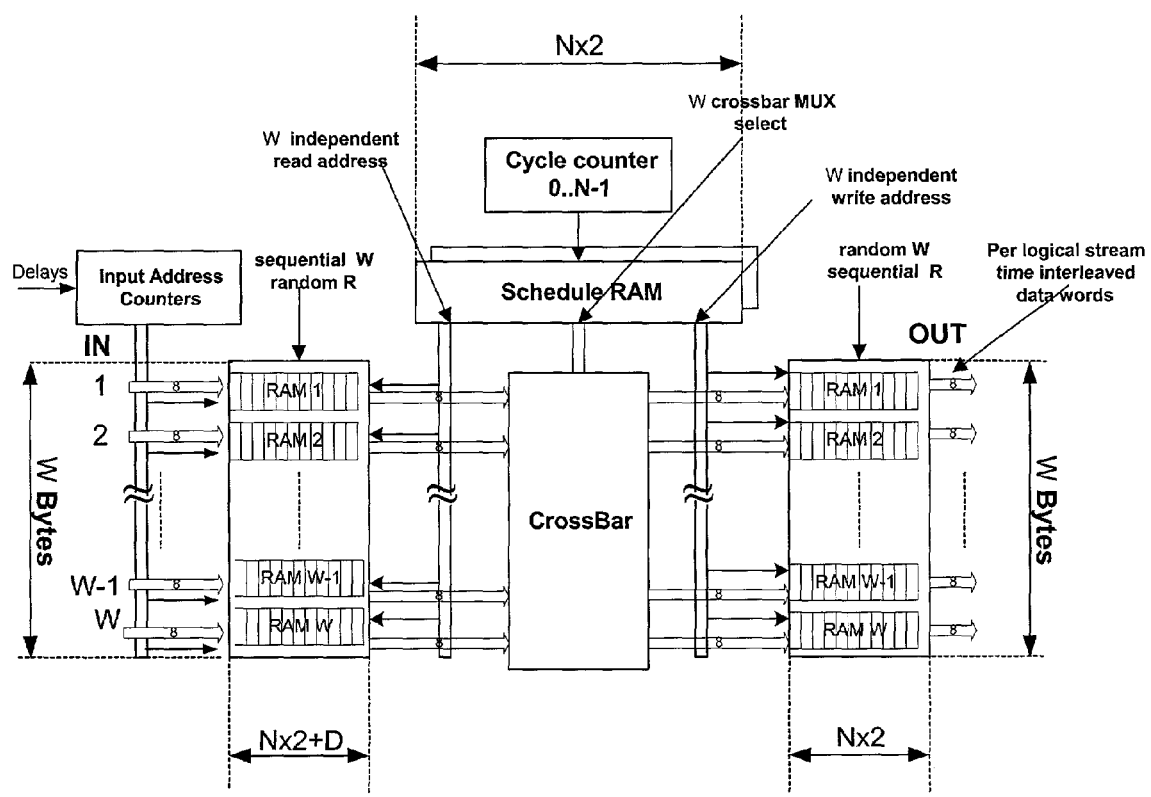
FIG. 5: Example Basic Building Block

FIG. 5 shows an apparatus according to specific embodiments of the invention that can perform an arbitrary permutation with space dimension W, period N, and maximum delay D. There are four functional blocks: 1) An input buffering block (IN) consisting of W independent buffers, each of depth 2N+D bytes, and its associated address counter, 2) a CrossBar that performs space switching among its W inputs and W outputs, 3) a Scheduler that schedules the permutation operation, e.g., at each cycle, it selects W bytes for permutation and controls addressing of input/output buffers as well as the operation of crossbar accordingly, 4) an output buffer block consisting of W independent buffers, each of depth 2N bytes.

At times, N contiguous bytes in the input and output buffers are reserved as the permutation working area and the other N contiguous bytes (or more for the delayed cases) are used for storage of incoming and outgoing bytes. In addition, if the delay D=0, input bytes are simply written into the buffers sequentially and there are exactly N bytes that have valid contents in every buffer and at any time. For instance, at the beginning of a W-by-N permutation, only the N bytes in the working area of each input buffer have contents and only the N bytes in the working area of each output buffer are empty. If D>0, input bytes are written into the right locations of the buffers according to their lead times as defined before, e.g., a byte with a lead time k is written into the byte location that is k bytes to the left of a sequential writing. By doing this, the invention provides that the permutation problem seen by the working areas is a permutation without delay. According to specific embodiments of the present invention, this buffer arrangement ensures a smooth operation: at every cycle, there are at least one empty byte in every input buffer, at least one word in the output buffers ready to be sent out, and at least W bytes participating in the permutation. The permutation is controlled by the scheduler. At a cycle, the scheduler addresses the input and output buffers to select W bytes from the input buffers and place the W output bytes of the crossbar onto the right locations of output buffers. The scheduler also informs the crossbar how to perform the spatial permutation.

For zero-overspeed operation, the structure in FIG. 5 requires that at each cycle the W bytes selected are from W distinct input buffers and are destined for W distinct output buffers. This constraint on the operation makes the scheduling nontrivial. A proof of the existence of such a schedule for an arbitrary time-space permutation of dimension W-by-N is given below.

A legal permutation is a permutation of W bytes from W distinct input buffers and destined for W distinct output buffers. A legal schedule is a schedule that completes the permutation of dimension W-by-N with N legal permutations.

Proof: Since input buffers and output buffers are all of depth N bytes, within any K input buffers, there are at least k bytes to be mapped into K distinct output buffers. By Hall's Marriage Theorem (Alan Tucker, "Applied Combinatorics", Third Edition, John Wiley & Sons, Inc. 1995. pp. 159, Theorem 2), there exists at least one legal permutation where distinct W elements are from different input buffers and destined for different output buffers. Now that there exists a legal permutation, the associated W bytes and their addresses in the input and output buffers can be removed. The remaining scheduling problem is the same as before except there are only N−1 bytes at each input and output buffer, i.e., it is a time-space permutation problem of dimension W-by-(N−1). By Hall's Marriage theorem again, there exists at least one legal permutation and the W bytes associated with the legal permutation can be removed. Continuing the above induction, it can be shown that there exist N distinct legal permutations and, hence, a legal schedule.

The above proof only shows the existence of a legal schedule. According to specific embodiments of the present invention, the problem of finding such a legal schedule can be transformed into a maximum bipartite graph-matching problem, which with its solutions has been well documented in the literature of graph theory. The complexity of a typical bipartite matching algorithm for the permutation problem of dimension W-by-N is $O(W^2N^2)$. It is also worthy to note that, since the constraints imposed on the scheduling is symmetric, a schedule that works for one direction, e.g., the direction of merging narrow streams into a wide stream, also works for the other direction. An example based on the structure shown in FIG. 5 is given in FIG. 6.

The example given in FIG. 6 is a permutation problem of dimension 4-by-8 with 3 channels carried over 4 streams to be merged onto one single output stream where channels are TDM. The reverse operation is shown by the dashed lines. Shown in the figure is only the working areas of the input and output buffers, which are the same regardless of the delay D. For instance, if A1 takes position of A4, A4 takes position of A7, and so on, then the write addresses for all other bytes will be delayed by 2 bytes such that when bytes A10 arrives, the contiguous 8 words in the input buffers is exactly like that shown in the figure. Table 1 gives an example schedule for both directions:

TABLE 1

| Cycle | Selected Bytes |
| --- | --- |
| 1 | B1, C3, A2, C4 |
| 2 | A1, C2, A3, A8 |
| 3 | C1, B2, C7, C8 |
| 4 | A4, C5, C6, B3 |
| 5 | A5, A6, A7, C12 |
| 6 | C9, C10, C11, B4 |
| 7 | A9, A10, A11, C16 |
| 8 | A12, C15, C13, C14 |

Extended Permutation Network

According to specific embodiments of the present invention, the structure shown in FIG. 5 is generic enough to support a two-dimensional permutation of any size. However, it will require buffers of large size for a large N+D, which is often impossible to accommodate in a single chip design. In this case, external memory is necessary. A straightforward solution is to remove all the buffers in FIG. 5 out of the chip, which has an undesirable feature that 2W memory banks are needed, each has their own address and data buses. Even for a small W, this solution implies a large number of pin counts. Note that in practices, the large dimension of a permutation problem is often due to the large differential delays among physical streams and, correspondingly, the large permutation delay D.

For this type of problems, the permutation is asymmetric at two directions, i.e., the dimension at the direction of demultiplexing a wide stream into narrow streams is smaller. Since the apparatus show in FIG. 5 with D=0 still works for the direction of demultiplexing, only the direction of merging will be discussed below.

In addition to the features discussed above, a desirable solution for this type of problems shall also have the following features: (1) The solution reuses the design shown in FIG. 5, which still applies to one direction. (2) The solution minimizes the pin counts and on-chip memory.

To find a solution satisfying the above features, it is worthy to note first that (1) If N is the period of a permutation, pN, for any positive integer p, is also the period of the permutation. (2) The NW contiguous input words of a permutation with period N can be regrouped into NW words in which all W bytes in a word have the same delays. For instance, entries (s, t+pN) for $0 \leq p \leq W$ have the same delays.

In light of the above two observations, in specific embodiments, the present invention employs two permutation stages and an external memory buffer in between. The first stage has two objectives: (1) Align bytes in the input buffer such that their relative delays in the input buffer are a multiple of NW. That is, a byte with a lead time of gNW+x, where g, x are positive integers and $1 \leq x \leq NW$, will be written into the byte location x bytes to the left of a sequential writing. The lead time after this operation becomes gNW. (2) Perform a permutation such that the bytes in each output word have equal delays. Consequently, only one bank external memory of width W bytes is needed, into which the output words of the first stage are written at appropriate locations according to their lead times. For instance, the output word with a lead time of gNW will be written into the external memory at location gNW words to the left of a sequential writing.

After the first stage processing, a block of contiguous NW words, which is a permutation of a desired output block, is filled with valid contents in the external memory. Hence the second stage needs only to read words from external memory sequentially and complete the permutation.

According to specific embodiments of the present invention, each stage is a permutation network as illustrated in FIG. 5. The first stage is a network for permutations with period NW and delay NW. Consequently, the depths of input buffers are 3NW and the depths of output buffers are 2NW. The second stage is also a network for permutations with period NW but without delay. Accordingly, the depths of its input and output buffers are both 2NW bytes. If the largest delay is D=gNW+x with g, x being positive integers and $1 \leq x \leq NW$, then the external memory needs to have (g+2) NW words, where one block of contiguous NW words is being read by stage 2, the remaining g+1 blocks are being written by stage 1.

The above steps are can also be described by the following:

Problem: (s, t)→(s', t'), $1 \leq s \leq W$, $1 \leq t \leq N$.

Known: (s, t+k(s, t))→(s', t'), $1 \leq s \leq W$, $1 \leq t \leq N$, is a permutation problem of dimension W-by-N, i.e., $\lfloor (t+k(s,t))/N \rfloor = \lfloor t'/N \rfloor$ where $\lfloor x \rfloor$ stands for the nearest integer of x towards zero.

k(s,t))=g(s,t)×NW+x(s,t), $1 \leq x(s,t) \leq NW$.

According to specific embodiments of the present invention, the locations in various buffers of input byte (s, t+pN), $1 \leq s \leq W$, $1 \leq t \leq N$, $0 \leq p \leq W$ as well as the working period the byte is loaded in are given by the tables below.

Case 1: If t + x(s, t) + pN = Np1 + t1 ≤ NW with $0 \leq p1 < W$ and $1 \leq t1 \leq N$, then

| Buffer | Permutation Period | Location |
|---|---|---|
| Input buffer 1 | 1 | (s, t + x(s, t) + pN) |
| Output buffer 1 | 1 | (p1 + 1, (t1 − 1)W + s) |
| Input buffer 2 | g(s,t) + 1 | (p1 + 1, (t1 − 1)W + s)) |
| Output buffer 2 | g(s,t) + 1 | (s', t' −⌊t'/(NW)⌋ × NW) |

Case 2: If t + x(s, t) + pN = NW + p2N + t2 > NW with $0 \leq p2 < W$ and $1 \leq t2 \leq N$, then

| Buffer | Permutation Period | Location |
|---|---|---|
| Input buffer 1 | 1 | (s, t + x(s, t) + pN) |
| Output buffer 1 | 2 | (p2 + 1, (t2 − 1)W + s) |
| Input buffer 2 | g(s,t) + 2 | (p2 + 1, (t2 − 1)W + s)) |
| Output buffer 2 | g(s,t) + 2 | (s', t' + ⌊t'/(NW)⌋ × NW) |

The above tables also lead to a straightforward schedule for the first stage instead of using complicated bipartite graph-matching algorithms. This schedule is based on a partition of the entire working area into W blocks, each having N contiguous words, e.g. block 1 consists of the first N bytes of each input stream, block 2 consists of the (N+1)th to 2Nth bytes of each input stream, and so on. Define byte t of stream s in block m as the nth byte of block m, where n=(t−1)W+s. Then the W bytes with the same sequential numbers, one from each block, have equal delays and will be written into the different bytes of the same output word. The nth byte of block m will be written into the mth byte of the nth output word. Two critical observations are now in order: with the numbering scheme defined above, none of the two bytes in any W bytes with continuous numbers under modulo NW, i.e., n, n+1, . . . , n+W, are located in the same input buffer bank, no matter if the two bytes are from the same or different blocks. Any two input bytes from different blocks are to be written into different output buffers.

With the two observations, a legal schedule consisting of NW clocks for stage 1 permutation can be easily constructed: at clock n, the W bytes are to be written into the output buffers are the (n+k)th bytes from blocks k+1, k=0, 1, . . . W−1 (if (n+k)>NW, then take the value of n+k−NW). This schedule can be easily accomplished by a fixed circuitry and therefore, the need for schedule RAM can be eliminated. However, for applications where the schedule RAM is not too big, a schedule RAM solution for the first stage may still be preferable to keep the two stages having exactly the same circuitry. FIG. 7A shows the diagram of an example two-staged permutation network according to specific embodiments of the present invention.

The above apparatus provides a generic solution for permutations with period N and arbitrary delay D. More efficient solutions are possible according to specific embodiments by restricting the design for particular practical problems. Particularly, multi-stream multiplexing/demultiplexing problems such as the examples described before have an important feature: Within N contiguous input words, there are a multiple of W bytes from each flow of a channel that is carried over a stream. Since the bytes from a channel carried over one stream have identical delays, any N contiguous words can be regrouped into N words, each has a single delay for all its W bytes. This suggests that if the above apparatus is used, the depths of the input and output buffers at stage 1 need only to be 3N and 2N, respectively; the depths of the input and output buffers at stage 2 need only to be 2N.

Take the example in FIG. 6 and assume that the data flow of channel A carried over stream 2, containing bytes A1, A4, A7, and so on, has a delay with respect to flows of channel A carried over streams 1 and 3 by 17. This means that at input side, byte A52 takes the position of A1, A55 takes the position of A4, and so on. Since 17=4*W+1 with W=4, the input bytes will be aligned to have a delay of 4*W=16. This is done by delay the bytes from other physical channels by 2 bytes in time. Then as the output bytes from the first stage are written into external memory, the words belonging to physical channel 2 is delayed by 32. Finally, the second permutation network sequentially reads words from the external memory and performs the final permutation.

FIG. 7B shows the data arrangements in various buffers.

Further description of example function blocks according to various specific embodiments of the invention is provided in detail below.

Input/Output Buffers

According to specific embodiments, a method and/or system of the present assumes the input data streams come in from a line interface and are globally synchronized to a common clock. The data go through clock domain synchronization externally. By the time data is presented to the invention, the data is are already synchronized to the system clock domain which can also be used by an implementation of the invention, hence allowing operation in a single clock domain.

An example input/output buffer consists of W independently addressed dual port RAMs (organized in Bytes in the context of this disclosure). Each RAM has separate read/write addresses and data ports. Alternatively, single port RAMs may be used but the RAMs need to run at twice the frequency of the clock of the rest part of the apparatus. In that case, in each system clock cycle, one read access and one write access need to be performed to each RAM. The input and output buffers have exactly the same structure although the depth of the RAM may vary according the range of differential delay accommodated by the design.

Input Address Counters

There are N×W independent address counters corresponding to a maximum number of N×W physical substreams supported according to specific embodiments of the present invention. Each physical stream uses a separate counter to generate the address for the stream according to its delay characteristics. Synchronized to the locked-steps of Round-Robin sequence of the streams, the system selects W consecutive counters (corresponding to the W physical streams that occurs at the current cycle) from the counter bank and use it as the W write addresses of the input RAMs. At the end of the cycle, the W selected counters are updated (incremented or reset). This Round-Robin process has a time period of N clock cycles.

The differential delay amount of each physical stream is embodied by the offset among the counters. There are a number of ways of providing the differential delay information to the address counters depending on the actual applications. The mechanism of differential delay indication affects the Input Counter Update logic.

A simple mechanism involves the external circuitry and generates a SOP (Start of Period) signal to indicate the start of a period when the first byte of a period of the physical stream arrives. The SOP signal is carried along with each arriving byte. The SOP signal can be used to reset the counter to ZERO. The counter update logic can be described as follows: if the SOP of the current selected counter is TRUE, the counter is reset to ZERO, otherwise, the counter value is incremented by 1.

In the case that the different delay values are provisioned statically in separate registers for each physical stream, a global counter can be used to provide a system time reference. The SOP signals can be generated locally in the counter update logic. SOP[i]=(Global_Counter==Differential_Delay[i]) where i is the index of the selected counter.

After an input failure condition such as loss of signal at the input interface, the delay-offset information needs to be resynchronized. If the self-synchronizing approach involving SOP signal is used, the resynchronization happens automatically. But if static provision of differential delay information approach is used, the control-plane software needs to recalculate the delay information according to the new line configuration after the failure. The new delay information is updated to allow a resumption of normal operation.

Counter Bank

According to specific embodiments of the present invention, a counter bank may be hardwired as logic circuitry. This is the most convenient approach if N×W is small. When N×W is large, the counter bank can be implemented in a small RAM or register file. Assuming the width of each individual counter is K, the depth of the RAM is N and the width is W×K. A global counter cycles from 0 to N−1 generating address to the counter bank RAM. Each clock cycle, W counters values are output from the RAM and are used by the input buffer logic of the permutation apparatus. Then W counters values are updated individually in parallel according to the same logic described above. Finally, the updated counter values are written back to the counter bank RAM. The update logic can be pipelined because the new counter values will not get used until N cycles after the current time. Again, the counter bank RAM can be implemented as dual port RAM running at system clock speed or single port RAM running at double system clock speed because each cycle two accesses (one read, one write) has to be performed to this RAM. An implementation of the counter bank based on dual port RAM and external SOP signals is illustrated in the FIG. 8.

Schedule RAM And Global Cycle Counter

The schedule RAM stores the pre-calculated N-cycle schedule. Each cycle, the schedule RAM presents W entries of Raddr (Read Address), Waddr (Write Address), and Csel (Crossbar Select). The bit width of the read address, Wa, equals to Log2(N); and the bit width of crossbar select, Wc, equals to Log2(W). So the total width of the Schedule RAM is W(2Wa+Wc). A copy of the schedule consists of N entries. But to support hitless reprovisioning of the marriage network, two copies of the schedules are required, one as the active schedule, the other for backup. Therefore, the total depth of the schedule RAM is 2N. An example of a Schedule RAM and surrounding circuit is shown in FIG. 9.

The global cycle counter serves as a sequencer for the schedule RAM and the output RAM. The counter cycles from 0 to N−1. The OutputRAM MSB Register toggles when the counter reaches the top value (N−1). In the Output RAM, the memory space of each of the W banks is divided into two sub-banks. Each sub-bank consists of N entries. The MSB register controls which sub-bank is used as the copy target (active subbank). The remaining one is the output sub-bank from which the output data should be sequentially read out. Hence the MSB_REG selects the output sub-bank and !MSB_REG selects the copy sub-bank.

The schedule RAM provides W independent read addresses for the input RAMs and W independent write addresses for the output RAMs. As described earlier, the most significant bit of the write addresses are generated from MSB_REG. The read ports of the output RAMs share the common address, which is form by concatenating the MSB_REG and the global cycle counter.

2. Example Method

Figure 10:
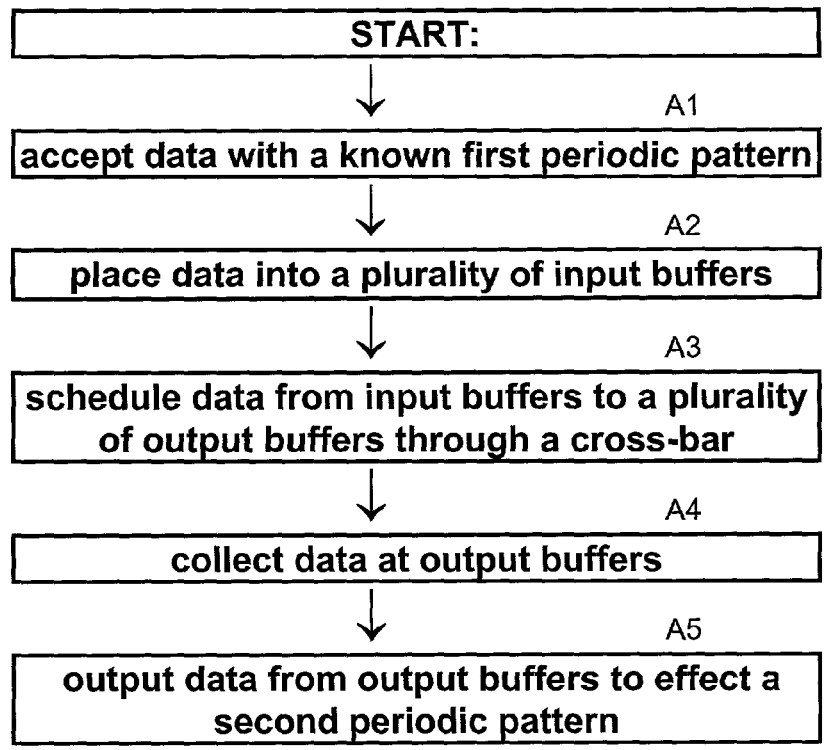
FIG. 10 is a flow chart illustrating a basic example method according to specific embodiments of the invention.

FIG. 10 is a flow chart illustrating a basic example method according to specific embodiments of the invention. A number of modifications and/or additions to this basic method are within the scope of the present invention, as discussed elsewhere herein. This method is illustrated by steps A1-A5 as indicated in the figure.

3. Embodiment in a Programmed Information Appliance

Figure 11:
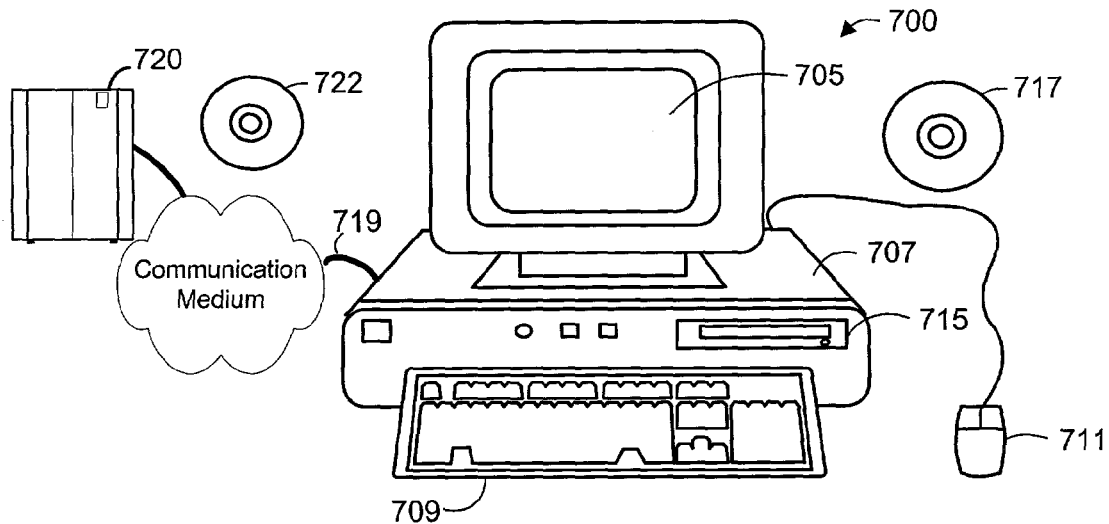
FIG. 11 is a block diagram showing a representative example logic device in which various aspects of the present invention may be embodied.

FIG. 11 is a block diagram showing a representative example logic device in which various aspects of the present invention may be embodied. As will be understood to practitioners in the art from the teachings provided herein, the invention can be implemented in hardware and/or software. As will be understood in the art, the invention or components thereof may be embodied in a fixed media program component containing logic instructions and/or data that when loaded into an appropriately configured computing device cause that device to perform according to the invention. As will be understood in the art, a fixed media containing logic instructions may be delivered to a viewer on a fixed media for physically loading into a viewer's computer or a fixed media containing logic instructions may reside on a remote server that a viewer accesses through a communication medium in order to download a program component.

FIG. 11 shows an information appliance (or digital device) 700 that may be understood as a logical apparatus that can read instructions from media 717 and/or network port 719, which can optionally be connected to server 720 having fixed media 722. Apparatus 700 can thereafter use those instructions to direct server or client logic, as understood in the art, to embody aspects of the invention. One type of logical apparatus that may embody the invention is a computer system as illustrated in 700, containing CPU 707, optional input devices 709 and 711, disk drives 715 and optional monitor 705. Fixed media 717, or fixed media 722 over port 719, may be used to program such a system and may represent a disk-type optical or magnetic media, magnetic tape, solid state dynamic or static memory, etc. In specific embodiments, the invention may be embodied in whole or in part as software recorded on this fixed media. Communication port 719 may also be used to initially receive instructions that are used to program such a system and may represent any type of communication connection.

The invention also may be embodied in whole or in part within the circuitry of an application specific integrated circuit (ASIC) or a programmable logic device (PLD). In such a case, the invention may be embodied in a computer understandable descriptor language, which may be used to create an ASIC, or PLD that operates as herein described.

4. Embodiment in a Data Network

Figure 12:
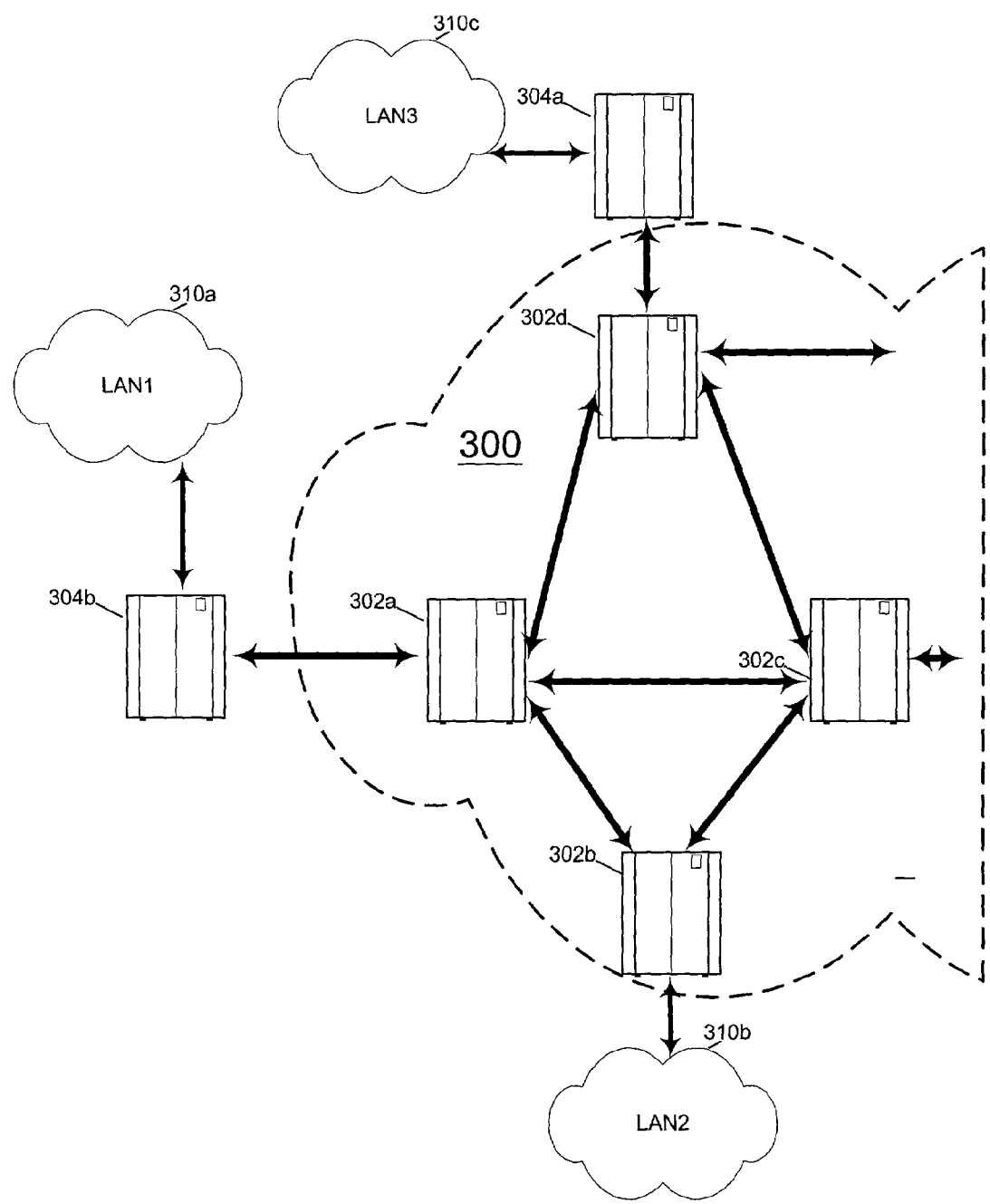
FIG. 12 is a block diagram showing a representative example network embodying the invention.

As will be understood to those of skill in the art, the present invention can be embodied as a data and/or communication network. FIG. 12 is a block diagram showing a representative example network embodying the invention. The figure represent a network 300 as a collection of communicating information appliances 302 and 304 (for example, routers or ATM switches) optionally connecting LANs 310 as will be understood in the art and handling data according to the invention.

Figure 13:
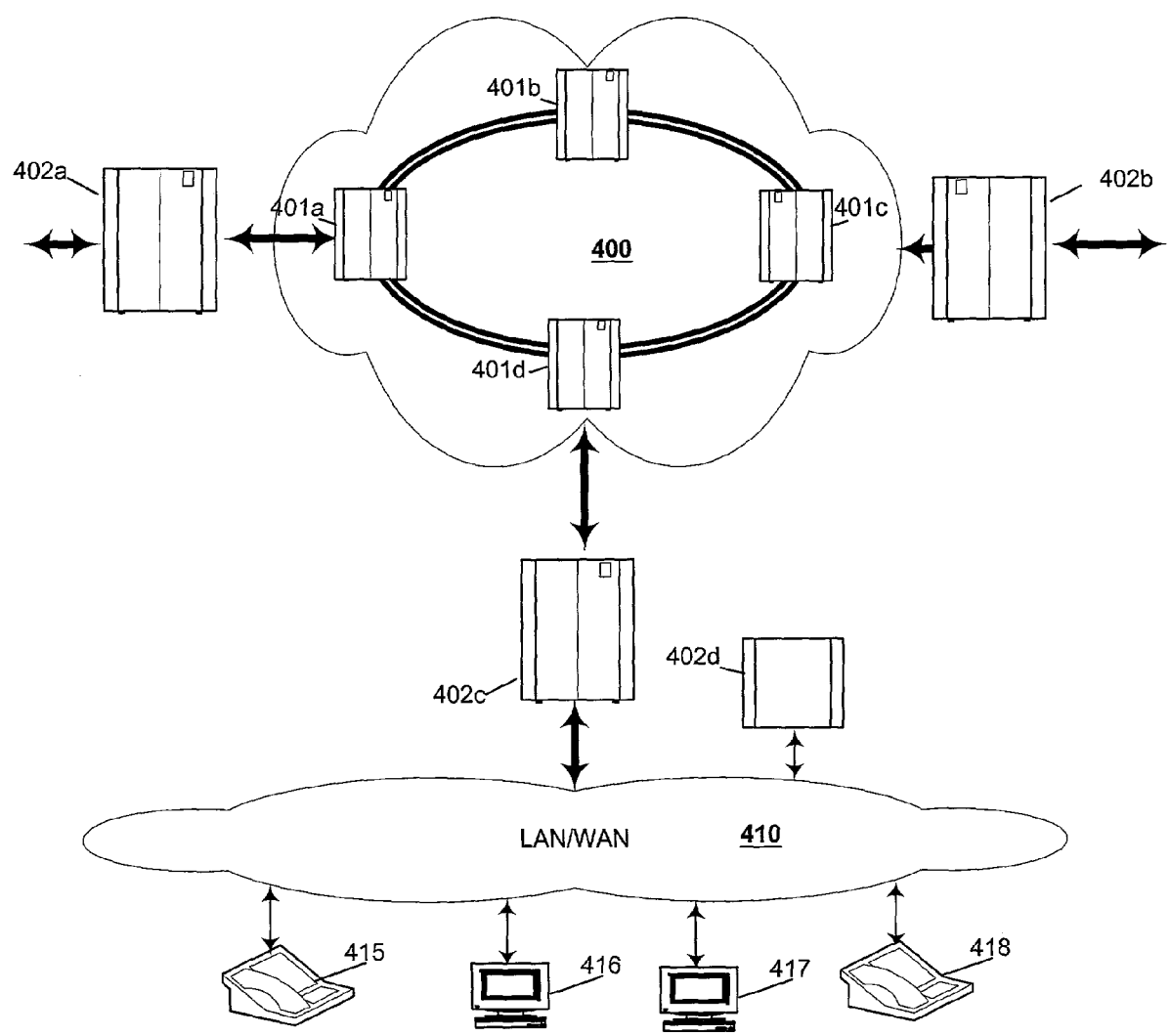
FIG. 13 is a block diagram showing a representative example network with an explicitly shown optical backbone embodying the invention.

FIG. 13 is a block diagram showing a representative example network with an explicitly shown optical backbone 400 with connection to a communicating information appliances 402 which are optionally connected to a LAN/WAN 410 and thereby to various networked devices 415, 416, 417, and 418. As mentioned above, the present according to specific embodiments is particularly useful when employed in a optical network information device, such as devices 401.

5. Other Embodiments

According to specific embodiments of the invention, a number of variations are possible within the general scope of the invention. Such variations include, but are not limited to: (1) A device according to the invention can be implemented in a Field Programmable gate array. (2) A device according to the invention can be implemented with a greater or smaller amount of differential delay. (3) A device according to the invention can be implemented with a larger or smaller number of inputs. (4) A device according to the invention can be implemented with faster or slower rate inputs. (5) A permutation algorithm according to specific embodiments of the invention can be implemented in a software program that collects data in a input buffer, performs a copy using a Marriage Network algorithm as described herein, and generates output in another data buffer. (6) A device according to the invention can be implemented with a greater or smaller datapath width size. (7) A device according to the invention can be implemented with a greater or smaller number of data streams. (8) A device according to the invention can be used as the second stage of a two-stage system, which transposes data and handles rate variation in the first stage through other methods such as input FIFOs, input shift register bank, or Butterfly network. (9) A device according to the invention can be implemented with or without external RAM. (10) A device according to the invention can be implemented with a byte oriented external RAM, no input network, and a full network on the output. (11) A device according to the invention can be implemented with a hardware schedule calculation circuit.

The invention has now been described with reference to specific embodiments. Other embodiments will be apparent to those of skill in the art. It is understood that the examples and embodiments described herein are for illustrative purposes and that various modifications or changes in light thereof will be suggested by the teachings herein to persons skilled in the art and are to be included within the spirit and purview of this application and scope of the claims.

All publications, patents, and patent applications cited herein or filed with this application, including any references filed as part of an Information Disclosure Statement, are incorporated by reference in their entirety.

What is claimed is:

1. A method of performing multi-dimensional permutation of data units in time and space comprising:
accepting data from a plurality of input interfaces into a plurality of input buffers, wherein said data arrives with a known first periodic pattern;
scheduling data from said plurality of input buffers to a plurality of output buffers through a cross-bar;
collecting data at said plurality of output buffers;
outputting data from said plurality of output buffers to an output interface to effect a second periodic pattern;
further wherein said input data comprises multiple flows having different delay characteristics and said method of performing multi-dimensional permutation realigns said multiple flows.

2. The method of claim 1 further comprising:
placing at least one data unit into offset positions in said plurality of input buffers to adjust for delay in data received at said input buffers.

3. The method of claim 1 further wherein:
said first periodic pattern proceeds without variation during operation;
wherein said method at times results in time variation due to delay in particular channels.

4. The method of claim 1 further wherein:
said first periodic pattern or said second periodic pattern can be reconfigured during operation.

5. The method of claim 4 further wherein:
said first periodic pattern or said second periodic pattern can be reconfigured during operation by loading new calendar information into a redundant schedule RAM portion and switching to said new calendar information at a period boundary.

6. The method of claim 1 wherein said method is pipelined.

7. The method of claim 1 wherein said method is scalable.

8. The method of claim 1 wherein one of the dimensions involved can be arbitrarily large as long as the permutation is entry-wise periodic at that dimension.

9. The method of claim 1 wherein said method provides a generalized approach of performing arbitrary mapping/interchange/switching function between two wide datapath interfaces and not requiring circuits that process data faster than an outgoing data rate.

10. The method of claim 1 wherein said method is performed to handle data in a SONET Virtual Concatenation Receive/Transmit processor.

11. The method of claim 1 wherein said permutation is a time-space permutation problem.

12. The method of claim 1 wherein said permutation is an entry-wise permutation problem with maximum delay (D) equal to 0.

13. The method of claim 1 wherein permutations performed are entry-wise periodic.

14. The method of claim 1 further comprising:
storing data from said output interface in a delay buffer to align for delays longer than generally characteristic of said multiple flows;
accepting data from a said delay buffer into a second plurality of input buffers;
scheduling data from said second plurality of input buffers to a second plurality of output buffers through a second cross-bar;
collecting data at said second plurality of output buffers;
outputting data from said second plurality of output buffers to an output interface to effect a final periodic pattern.

15. A permutation network device comprising:
an input buffering block comprising a plurality of independent input buffers;
an input buffer address counter;
a crossbar that performs space switching;
a scheduler that schedules permutation operations; and
an output buffering block comprising a plurality of independent output buffers;
wherein an order of writing into said output buffering block is determined by said scheduler;
further wherein:
said input buffering block comprises W independent buffers, each of depth 2N+D bytes, where W is greater than zero and indicates a width of bytes handled at one time, N indicates a period of input data, and D represents a maximum delay;
said crossbar performs space switching among W inputs and W outputs; and
said output buffer block comprises W independent buffers, each of depth 2N bytes.

16. The device of claim 15 wherein said permutation network is scalable.

17. The device of claim 15 wherein said input buffer address counter provides an offset.

18. The device of claim 15 further comprising a generic, scalable, and simple basic permutation network suitable for permutations of relatively small dimensions of four or more inputs as well as entry-wise periodic permutations of small maximum delays.

19. The device of claim 15 wherein said device performs an arbitrary permutation with space dimension W, period N, and maximum delay D, where W, N and D are greater than 0.

20. The device of claim 15 wherein said scheduler, at a cycle, selects W bytes for permutation and controls addressing of input/output buffers as well as the operation of crossbar accordingly.

21. The device of claim 15 wherein:
the order of writing into said input buffering block is determined by said input buffer address counter.

22. The device of claim 15 wherein:
said output buffering block is randomly accessible at its write port and sequentially accessible at its read port.

23. The device of claim 15 wherein:
said input buffering block is randomly accessible at its read port and sequentially accessible at its write port.

24. The device of claim 15 further wherein, at times, a number N contiguous bytes in said input and output buffering blocks are reserved as a permutation working area.

25. The device of claim 15 wherein a further N or more contiguous bytes are used for storage of incoming and outgoing bytes.

26. The device of claim 15 further wherein, if the delay (D)=0, input bytes are written into said input buffers sequentially and there are N bytes that have valid contents in every buffer and at any time.

27. The device of claim 15 further wherein if maximum delay D>0, input bytes are written into the correct locations of said buffering blocks according to their lead times.

28. The device of claim 15 wherein said scheduler schedules permutations without delay.

29. The device of claim 15 wherein, during operation at every cycle:

there is at least one empty byte in every input buffer;
at least one word in the output buffers ready to be sent out;
and at least W bytes participating in the permutation, where W indicates the processing byte-width of said device.

30. The device of claim 15 further wherein permutation is controlled by said scheduler, which, at each cycle, addresses said input and output buffering blocks to select W bytes from the input buffering blocks and place the W output bytes of the crossbar onto the right locations of output buffering blocks and directs said space switching performed by said crossbar.

31. The device of claim 30 further wherein at each cycle the W bytes selected are from W distinct input buffers and are destined for W distinct output buffers.

32. The device of claim 15 further wherein a legal permutation is a permutation of W bytes from W distinct input buffers and destined for W distinct output buffers and a legal schedule is a schedule that completes the permutation of dimension W-by-N with N legal permutations.

33. The device of claim 32 further wherein a legal schedule is found by transforming a search into a maximum bipartite graph-matching problem.

34. The device of claim 15 further wherein said device is fabricated on a single chip.

35. The device of claim 15 further wherein operating portions of said device are on a single chip with at least one buffer placed on external memory.

36. The device of claim 15 further wherein at every cycle:
there is at least one empty byte in every input buffering block;
there is at least one word in said output buffering blocks ready to be sent out; and
there are at least W bytes participating in said permutation, wherein W represents a byte width of an interface to said input or output buffering blocks;
wherein W is 1 or more.

37. The device of claim 15 further comprising:
a first permutation stage and a second permutation stage.

38. The device of claim 37 further comprising:
an external memory buffer between said first permutation stage and said second permutation stage.

39. The device of claim 37 further wherein said first permutation stage performs the following:
aligning bytes in said input buffering block such that said byte's relative delays in said input buffering block are a multiple of NW, wherein W represents the byte width of an input or output interface and N indicates length of a permutation period; and
performing a permutation such that the bytes in each output word have equal delays.

40. The device of claim 39 further wherein as a result, only one bank external memory of width W bytes is needed, into which output words of the first stage are written at appropriate locations according to said output words' lead times.

41. The device of claim 37 further wherein after first stage processing, a block of contiguous NW words, which is a permutation of a desired output block, is filled with valid contents in an external memory buffer.

42. The device of claim 37 further wherein the second stage reads words from external memory sequentially.

43. The device of claim 37 wherein each stage is a permutation network.

44. The device of claim 37 wherein the first stage is a network for permutations with period NW and delay NW with depths of input buffers 3NW and depths of output buffers 2NW.

45. The device of claim 37 wherein the second stage is a network for permutations with period NW but without delay and with depths of its input and output buffers both 2NW bytes.

46. The device of claim 37 wherein a precalculated schedule for the first stage can be employed.

47. The device of claim 46 wherein said schedule is based on a partition of an entire working area into W blocks, each having N contiguous words.

48. The device of claim 46 wherein as a result, W bytes with the same sequential numbers, one from each block, have equal delays and will be written into the different bytes of the same output word.

49. The device of claim 46 wherein a legal schedule consisting of NW clocks for said first permutation stage can be constructed by:
at clock n, the W bytes are to be written into the output buffers are the (n+k)th bytes from blocks k+1, k=0, 1, ... W−1;
further wherein if (n+k)>NW, then take the value of n+k−NW.

50. The device of claim 49 wherein said schedule is accomplished by fixed circuitry.

51. A communications system comprising:
a plurality of routers, at least one router including a device according to claim 15; and
a network communication media; and
a plurality of interfaces to destinations.

52. A logic device for communicating data in a data network comprising:
at least one input interface;
a plurality of input buffers with randomly accessible write interfaces;
an input address counter for placing data in said input buffers to compensate for delays and align data;
a cross-bar connecting said input buffers to output buffers;
a scheduler scheduling data between said input buffers to said output buffers;
at least one output interface;
further wherein said device includes a permutation network;
further wherein:
said plurality of input buffers comprises W independent buffers, each of depth 2N+D bytes, where W is greater than zero and indicates a width of bytes handled at one time, N indicates a period of input data, and D represents a maximum delay;
said crossbar performs space switching among W inputs and W outputs; and
said output buffers comprise W independent buffers, each of depth 2N bytes.

53. A device for performing multi-dimensional permutation of data units in time and space comprising:
means for accepting data from a plurality of interfaces into a plurality of input buffers;
means for scheduling data from said plurality of input buffers to a plurality of output buffers using a cross-bar means;

means for collecting data at said plurality of output buffers; and means for outputting data from said plurality of output buffers to an output interface;

wherein an order of writing into said output buffers is determined by said means for scheduling data;

further wherein:

said plurality of input buffers comprises W independent buffers, each of depth 2N+D bytes, where W is greater than zero and indicates a width of bytes handled at one time, N indicates a period of input data, and D represents a maximum delay;

said crossbar performs space switching among W inputs and W outputs; and said output buffers comprise W independent buffers, each of depth 2N bytes.

* * * * *